May 6, 1924.
G. E. NEUBERTH
1,492,697
MACHINE FOR FLUSHING SAUSAGE CASINGS AND THE LIKE
Filed Jan. 25, 1924
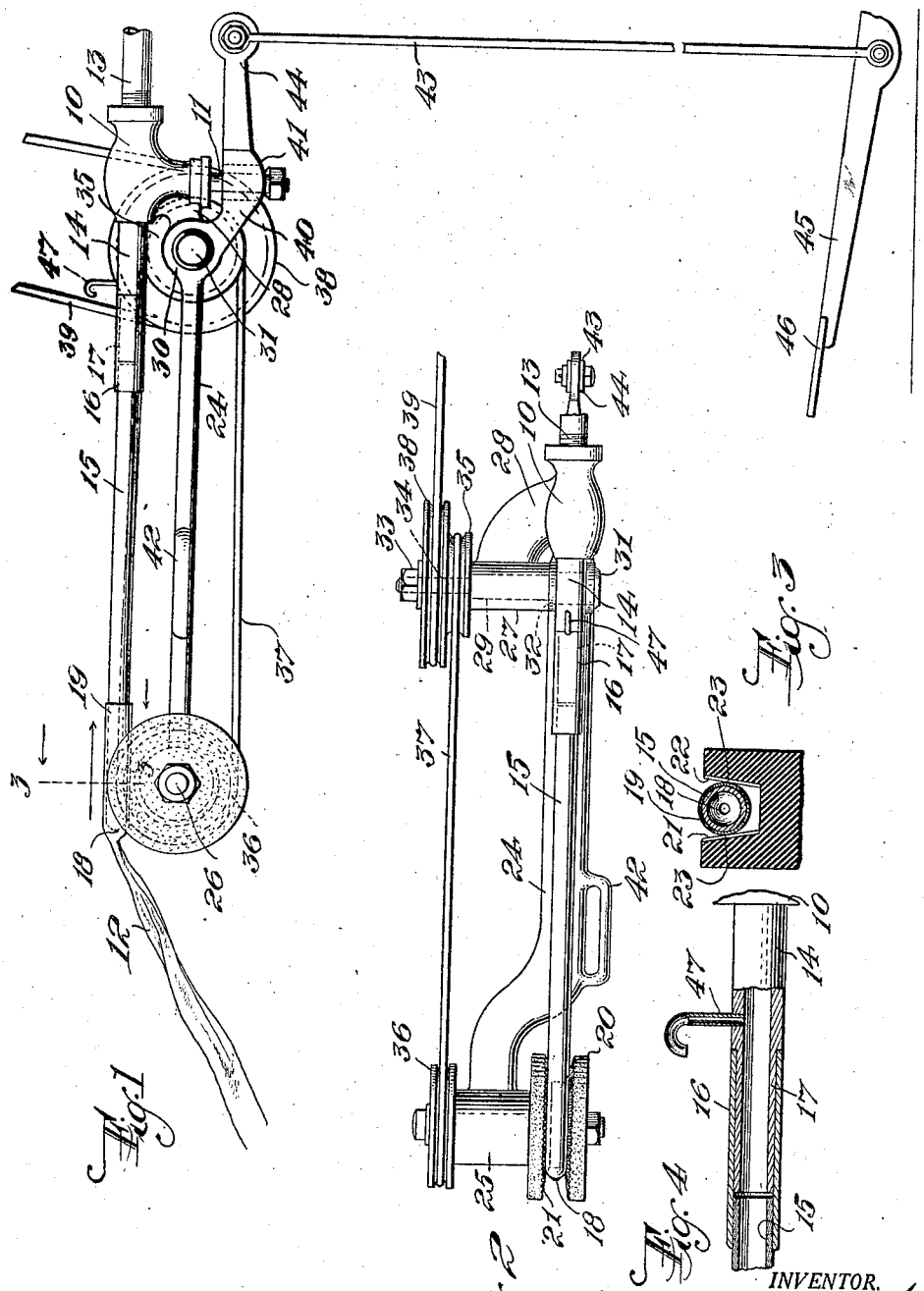
INVENTOR.
George E. Neuberth,
BY Wm H Caufield
ATTORNEY.

Patented May 6, 1924.

1,492,697

UNITED STATES PATENT OFFICE.

GEORGE E. NEUBERTH, OF NEWARK, NEW JERSEY.

MACHINE FOR FLUSHING SAUSAGE CASINGS AND THE LIKE.

Application filed January 25, 1924. Serial No. 688,490.

*To all whom it may concern:*

Be it known that I, GEORGE E. NEUBERTH, a citizen of the United States, and a resident of Newark, county of Essex, and State of New Jersey, have invented certain new and useful Improvements in Machines for Flushing Sausage Casings and the like, of which the following is a specification.

This invention relates to an improved machine for flushing the casings of sausages, bolognas and the like and is adapted to clean the inside of the casings and place them in gathered form on a mandrel as they are cleaned.

The machine is of the type that automatically turns on the water for cleaning when a feed wheel engages the casing to feed it on the mandrel and also shuts the water off when the feeding stops.

In this improved machine the mandrel is readily removable so that the mandrel with the casing on it can be removed from the machine and placed on a filling machine in which the filling of the casing is accomplished so that the casing need not be disturbed or removed before filling.

The invention is designed to provide a machine that is a unitary structure and is supported from the valve casing so that when the valve is secured to the end of a water pipe, the machine is ready for operation.

The invention is illustrated in the accompanying drawing in which Figure 1 is a side view of the machine embodying my invention. Figure 2 is a top view of the machine shown in Figure 1. Figure 3 is a section of a part of the machine taken on line 3—3 in Figure 1. Figure 4 is a detail section showing how the mandrel can be secured to the valve.

In the drawing the valve is shown at 10 and it may be of any usual type of water valve having the stem 11 for its operation and in a machine of this kind it is so adjusted that when the valve is opened to its maximum there is only a small quantity of water admitted, as all that is needed is a gentle flow of water and furthermore, a more vigorous stream would damage in many cases the casing shown at 12 since these casings are the intestines of animals and the walls are sometimes ruptured on being unduly distended.

The valve 10 is suitably secured to a water supply pipe 13 being usually attached simply by screwing it on and on the other end it has an extension 14 to which the mandrel 15 is detachably secured. The mandrel is hollow and being tubular it is preferably attached by sliding the sleeve 16 at the end of it over the reduced parts 17 of the extension 14, this fit being a tight sliding fit so that when the mandrel is slid onto the valve there is no leakage and the water passes from the valve to the extension 14 and the mandrel 15 and emerges through an orifice 18 in the end of the mandrel.

The intestine is placed over the end of the mandrel, the short end as at 19 being fed on by hand and in the further operation of the machine it is fed to the mandrel by a feed wheel 20 which is preferably grooved as at 21 to receive the mandrel, the feed wheel being made of resilient material such as soft rubber and having roughened or serrated faces 22 on the side walls of the groove, these side walls being tapered so that the contact of the casing 12 is on approximately opposite sides of the mandrel shown at 23 so that the feeding of the casing is even.

This feeding is also easy because the mandrel is usually made of metal, smooth on the outside, and the casing being wet, it slips easily thereon and being very pliable it is bunched or gathered on the mandrel so that a long length of casing can be assembled on the mandrel at one time.

The feed wheel is normally out of contact with the mandrel and is so mounted that when it is in contact with the mandrel the valve is turned on so that water is fed to the mandrel. One form of mounting this feed wheel is shown in the drawing in which I illustrate an arm 24 having the bearing 25 on one end in which a shaft 26 is mounted which shaft supports the feed wheel 20.

The arm 24 is pivotally supported on its other end by the bracket 27 which bracket is usually an integral part of the valve casing of the valve 10 in the form shown the web connecting the bracket to the valve casing. The bracket 27 supports a rod or shaft 29 which acts as a pivotal support for the boss 30 of the arm 24.

The head 31 of the rod 29 holds the boss 30 on and the shoulder 32 prevents undue binding when the nut 33 on the reduced part 34 of the rod 29 is tightened up. The reduced part 34 acts as a bearing for a pulley 35 which drives a pulley 36 on the bearing 25 which is connected to the shaft 26.

The pulleys 35 and 36 are shown as being connected by a belt 37 and a driving pulley 38, connected to the pulley 35 so that they rotate together, is driven by a suitable driving belt 39 from any outside source of power.

An extension part 40 of the arm 24 is used to connect the arm 24 with the valve so that when the arm 24 is swung up to cause the feed wheel 20 to engage the mandrel, the extension 40 swings downwardly since the arm is pivoted at 30 intermediate of its length. When the part 40 is thus depressed it engages the nut 41 which is adjustable on the stem 11 and the valve 10 is opened.

The operation will thus be obvious and that after the portion 19 is placed on the end of the mandrel where the feed wheel can engage it, the arm 24 can be grasped by the handle 42 and raised until the feed wheel engages the casing 12 and it at once starts to feed it on to the mandrel at the same time forcing the valve stem 11 and the water is turned on.

It will be noted that all the associated parts are carried from the valve casing so that when the valve is screwed into position on the pipe 13 the machine is in position for operation, assuming of course, that the pipe 13 is rigidly held against a suitable support or wall.

After the casing has been fed onto the mandrel 15, the arm 24 is allowed to drop, the valve stem 11 is released and forced by the extension 40 or by a suitable spring inside of it to closed position.

The device can be operated by a foot lever if desired and I show in the drawing a rod 43 connected to the end 44 of the extension 40 of the arm 24 connected also to the foot lever 45 supported at one end (not shown) on a suitable fulcrum so that when the foot piece 46 is pushed down, the arm 42 is swung to open the valve and place the feed wheel 20 in operative position.

When the machine has accomplished its feeding of the casing onto the mandrel and the arm 24 is allowed to drop, the mandrel can be slipped from the extension 14 of the valve and can then be placed on the outlet of a filling machine and the casing can be filled as it is taken from the mandrel 15 thus requiring no handling of the casing apart from the mandrel between the flushing of it and the filling of it.

To prevent excessive pressure on the casing 12 in case of stoppage therein, I arrange an over flow pipe 47 which takes care of any over flow due to back pressure in the mandrel and also serves to indicate to the operator that there is a stoppage of the flow from the mandrel or through the casing 12.

I claim:

1. A machine for flushing sausage casings and the like comprising a water supply means including a valve, a hollow mandrel with an orifice in the end, said mandrel being adapted to have the casing gathered on it and to conduct water to the inside thereof as it approaches the mandrel, an arm carrying a resilient feed wheel at one end to feed the casing on the mandrel and having a connection with the valve to control the flow of water.

2. A machine for flushing sausage casings and the like comprising a water supply means including a valve, a hollow mandrel readily detachable from the valve, the mandrel having an orifice in its end, a pivoted arm with a feed wheel on one end to force the casing on the mandrel and having a connection with the valve to control the flow of water, all these associated parts being supported by the valve.

3. A machine for flushing sausage casings and the like comprising a valve having a bracket thereon, an arm pivoted on the bracket, operatively connected pulleys on the bracket and on the end of the arm, a feed wheel on the end of the arm and operated from the pulleys, a readily removable hollow mandrel fitting on the valve with its outer end in the path of the feed wheel, and a connection between the arm and the valve so that when the feed wheel engages the mandrel the valve is turned on.

4. A machine for flushing sausage casings and the like comprising a valve being adapted for connection with a pipe on one end and having a tubular projection on the other end, a hollow mandrel with one end adapted to slip over the projection on the valve, a bracket on the valve, an arm swinging on the bracket and having one end in engagement with the stem of the valve, a resilient grooved feed wheel on the other end of the arm, a pulley rotating with the feed wheel and a pulley on the bracket, the pulleys being operatively connected, the parts forming a unitary structure that is operatively supported when the valve is secured to a pipe.

In testimony that I claim the foregoing, I have hereto set my hand, this 24th day of January, 1924.

GEO. E. NEUBERTH.